United States Patent
Haase (10) Patent No.: US 8,359,851 B2
(45) Date of Patent: Jan. 29, 2013

(54) TRIM ACTUATOR ACTUATING SYSTEM FOR A HYDRAULICALLY ACTUATABLE TRIMMABLE HORIZONTAL STABILIZER ACTUATOR

(75) Inventor: Gunnar Haase, Wedel (DE)

(73) Assignee: Airbus Operations GmbH, Hamburg (DE)

(*) Notice: Subject to any disclaimer, the term of this patent is extended or adjusted under 35 U.S.C. 154(b) by 578 days.

(21) Appl. No.: 12/065,928

(22) PCT Filed: Sep. 6, 2006

(86) PCT No.: PCT/EP2006/008696
§ 371 (c)(1),
(2), (4) Date: Apr. 11, 2008

(87) PCT Pub. No.: WO2007/028597
PCT Pub. Date: Mar. 15, 2007

(65) Prior Publication Data
US 2008/0203234 A1   Aug. 28, 2008

Related U.S. Application Data

(60) Provisional application No. 60/714,918, filed on Sep. 7, 2005.

(30) Foreign Application Priority Data

Sep. 7, 2005 (DE) .......................... 10 2005 042 511

(51) Int. Cl.
*F15B 15/26* (2006.01)
(52) U.S. Cl. .................. 60/406; 92/19; 92/26
(58) Field of Classification Search .............. 60/406, 60/405; 91/44; 92/19, 26
See application file for complete search history.

(56) References Cited

U.S. PATENT DOCUMENTS

| | | | | |
|---|---|---|---|---|
| 2,706,009 A | * | 4/1955 | Schramm | 92/19 |
| 2,730,994 A | * | 1/1956 | Light | 91/44 |
| 2,838,027 A | * | 6/1958 | Branick | 92/19 |
| 4,840,031 A | | 6/1989 | Hribar | |
| 5,181,380 A | | 1/1993 | Favre | |
| 6,832,540 B2 | | 12/2004 | Hart | |
| 7,600,715 B2 | * | 10/2009 | Matsui | 60/405 |

FOREIGN PATENT DOCUMENTS

| | | |
|---|---|---|
| DE | 1256077 | 12/1967 |
| GB | 859 504 | 1/1961 |
| GB | 1034020 | 12/1963 |
| JP | 3162139 B2 | 4/2001 |
| RU | 1 372 816 | 5/1996 |
| WO | WO 96/36555 | 11/1996 |
| WO | 2004083649 A1 | 9/2004 |

OTHER PUBLICATIONS

International Search Report and Written Opinion dated Jan. 5, 2007, issued in corresponding Int'l Application No. PCT/EP06/008696.
Mare J.-CH: "Commandes De Vol Hydrauliques: Une Evolution Vers La Mecatronique," Energie Fluide, CFE. Paris, FR, vol. 35, No. Special, pp. 6-8, 10. XP000731548 (Dec. 1997)—ISSN: 0291-8331.

* cited by examiner

*Primary Examiner* — F. Daniel Lopez
(74) *Attorney, Agent, or Firm* — Ingrassia Fisher & Lorenz P.C.

(57) ABSTRACT

The present invention relates to a trim actuator actuating system having two separate hydraulic power supply systems, through which it is possible for the first time to use a hydraulic linear actuator as a trimmable horizontal stabilizer actuator in an aircraft. The at least one hydraulic linear actuator is coupled to the first power supply system in such a way that it applies hydraulic power to the linear actuator during normal operation. In order to ensure the application of pressure to the hydraulic linear actuator in case of breakdown, in such a case, the pressure application to the hydraulic linear actuator is maintained with the aid of the second hydraulic power supply system.

12 Claims, 5 Drawing Sheets

TRIM ACTUATOR ACTUATING SYSTEM FOR A HYDRAULICALLY ACTUATABLE TRIMMABLE HORIZONTAL STABILIZER ACTUATOR

CROSS REFERENCE TO RELATED APPLICATIONS

The present application is a 35 U.S.C. §§371 national phase conversion of International application No. PCT/EP2006/008696, filed Sep. 6, 2006, which claims priority of German Patent Application No. 10 2005 042 511.9, filed Sep. 7, 2005, and U.S. Provisional Application No. 60/714,918, filed Sep. 7, 2005, the disclosures of which have been incorporated herein by reference. The PCT International Application was published in the English language.

TECHNICAL FIELD

The present invention relates in general to supplying hydraulic consumers in aircraft with power. In particular, the present invention relates to a trim actuator actuating system for a hydraulically actuatable trimmable horizontal stabilizer actuator in an aircraft. Furthermore, the present invention relates to the use of such a trim actuator actuating system in an aircraft to actuate at least one trimmable horizontal stabilizer actuator. In the relevant technical terminology, linear actuators which are used for inclination change of aircraft fins in relation to the longitudinal orientation of the aircraft fuselage are referred to as "trimmable horizontal stabilizer actuators" (THSA for short), this name also being used in the scope of the present invention for linear trim actuators of this type.

BACKGROUND OF THE INVENTION

Typically, aircraft fins whose inclination is changeable in relation to the longitudinal orientation of an aircraft fuselage are trimmed, i.e., their inclination in relation to the aircraft fuselage is changed, using trapezoidal thread spindles or recirculating ball spindles. Since very high requirements in regard to their reliability and/or breakdown probability must be placed on trim actuators of this type, two load paths must typically be provided, which may be implemented through a double spindle, for example. Alternatively to this, it is also possible to implement two load paths in only one spindle in the form of an integrated construction.

Implementations of trimmable horizontal stabilizer actuators in the form of recirculating ball spindles or trapezoidal thread spindles of this type are very complex because of the required redundancy and the required synchronization of the individual spindles. The number of components required is relatively large, because of which the implementation becomes relatively difficult. In addition, wear and in turn a corresponding play result due to the movable mechanical components of such spindles. In the extreme case, such play in the spindles may also result in undesired aeroelastic effects on the fins, which may finally even result in flapping of the wings.

In addition, the very complex constructions of these redundantly constructed trimmable horizontal stabilizer actuators may result in so-called sleeping faults if spindles are used, which are frequently not recognized in a timely manner. In order to nonetheless recognize faults of this type, a significant monitoring outlay is required, because of which the trim actuators become even more complex and heavy.

Since until now all conceivable efforts have been undertaken to optimize a trimmable horizontal stabilizer actuator using trapezoidal thread or recirculating ball spindles in regard to its breakdown probability in its weight, without this having resulted in significant improvements, there is still a need for a trimmable horizontal stabilizer actuator which has a light construction and reliably fulfills the enormous requirements on its breakdown probability.

SUMMARY OF THE INVENTION

On the basis of the problems connected with the previously described known trimmable horizontal stabilizer actuators, there may be a need to provide a trimmable horizontal stabilizer actuator which has a lighter construction than known actuators and which nonetheless fulfills the enormous requirements in regard to the necessary breakdown probability.

To meet this need, according to a first aspect of the present invention, a hydraulic linear actuator such as a hydraulically actuatable piston cylinder unit is used for the first time as a trimmable horizontal stabilizer actuator, which is referred to in the following in short form as a trim actuator. Since known piston cylinder units have breakdown probabilities of approximately $1 \cdot 10^{-4}$ 1/h, the high requirement placed on trim actuators, which is $1 \cdot 10^{-6}$ 1/h, may not be achieved using a piston cylinder unit of this type alone. Since this required breakdown probability may not be achieved using a typical piston cylinder unit, until now those skilled in the art saw themselves as being prevented from using typical piston cylinder units of this type as trim actuators.

Therefore, it is suggested that a trim actuator actuating system for a hydraulically actuatable trimmable horizontal stabilizer actuator of an aircraft be provided which comprises at least one hydraulic linear actuator such as a piston cylinder unit, as well as a first hydraulic power supply system and an autonomous second hydraulic power supply system independent therefrom. The at least one hydraulic linear actuator is coupled to the first power supply system in such a way that the hydraulic linear actuator may have hydraulic power applied to it by the first power supply system during normal operation. Normal operation means here that the first power supply system operates perfectly. In addition, the at least one hydraulic linear actuator is coupled to the second hydraulic power supply system in such a way that the linear actuator may have hydraulic power applied to it by the second power supply system during malfunction operation (i.e., for example, during breakdown of the first power supply system).

Since the specified known breakdown probability of a linear actuator of approximately $1 \cdot 10^{-4}$ 1/h relates to a linear actuator having only one hydraulic power supply system, by providing an autonomous second hydraulic power supply system, the breakdown probability may be reduced to the required target value of $1 \cdot 10^{-6}$ 1/h or less. In addition, the trim actuator actuating system according to the present invention may have a less complex construction than known spindle actuators, through which the weight of the trim actuator may be significantly reduced. In addition, a hydraulic linear actuator may have a significantly smaller overall volume than the known threaded spindles to be provided redundantly, which is desirable at all times in the field of aerospace engineering, of course. A further advantage achievable with the aid of the trim actuator actuating system according to an embodiment of the present invention may be that higher adjustment speeds may be implemented using a hydraulic linear actuator as is usable in the trim actuator actuating system according to an exemplary embodiment of the present invention than using typical trim actuators employing threaded spindles.

If the first hydraulic power supply system does actually break down, a control unit may switch over the hydraulic pressure application of the at least one linear actuator to the autonomous second hydraulic power supply system. For this purpose, both the first power supply system and also the second power supply system may be coupled to the control unit, which is implemented to recognize the breakdown of the first power supply system in order to subsequently activate the second hydraulic power supply system immediately. During normal operation, the at least one hydraulic linear actuator may thus be supplied with hydraulic power from the first power supply system via the control unit; in contrast, the at least one hydraulic linear actuator may be supplied with hydraulic power from the second power supply system via the control unit during malfunction operation.

It would be conceivable to implement the first hydraulic power supply system as an independent unit, however, it suggests itself that the first hydraulic power supply system be coupled to the hydraulic main power supply of the aircraft, which is provided in any case. In this way, multiple different trim actuators controlled by the control unit may have hydraulic power applied to them using the very high-performance main power supply of the aircraft.

In contrast, the second power supply system is a hydraulic unit completely independent from the main power supply of the aircraft, which has a separate hydraulic fluid container and a separate electrically actuatable hydraulic pump, for example. Through this completely autonomous implementation of the second hydraulic power supply system, the breakdown probability may be significantly reduced, since it is no longer coupled to the breakdown probability of the main power supply of the aircraft.

So that completely separate lines do not have to be laid for the power supply to the at least one linear actuator using the second power supply system, the second power supply system may be coupled to the first power supply system to apply hydraulic power to the first power supply system in this way during malfunction operation. In this way, additional weight may be saved, which is a principle always to be maintained in the field of aerospace engineering.

Using the trim actuator actuating system described above, a first security stage may be achieved in that the power supply of the at least one linear actuator is maintained via the second power supply in case of a breakdown of the first power supply. In order to prepare for the case in which the second power supply system also breaks down, a second security stage may be implemented in that the at least one linear actuator in the form of a piston cylinder unit comprises a mechanical lock, which is implemented so that it fixes the piston rod in relation to the cylinder in the last position set before the breakdown if the first and the second power supply systems break down.

This mechanical lock may be constructively implemented according to a first embodiment in such a way that it comprises a plurality of first formfitting elements, which are situated around the outer circumference and in the longitudinal direction of the cylinder at specific intervals to one another. Furthermore, the lock comprises at least one second formfitting element, which moves jointly with the piston rod upon an actuation of the linear actuator and passes a section of the cylinder at the same time. The joint movement of the second formfitting element with the piston rod may be achieved by at least indirectly connecting the formfitting element to the piston rod. In order to fix the piston rod in relation to the cylinder, the at least one second formfitting element is implemented to engage in a formfitting way with one of the plurality of first formfitting elements at a discrete location in the longitudinal direction of the cylinder. Since the second formfitting element, as already noted, is at least indirectly connected to the piston rod, further actuation is prevented by the form fit thus achieved, so that if the power supply to the linear actuator breaks down, the last set position of the linear actuator may be maintained using the lock according to an exemplary embodiment of the present invention.

As an alternative to this first implementation of the lock, it would also be possible to reverse the relationships. In this case, the lock comprises at least one first formfitting element according to an alternative second embodiment, which is situated on the outer circumference of the cylinder in the area of the exit of the piston rod. Furthermore, the lock comprises a plurality of second formfitting elements, which move jointly with the piston rod upon an actuation of the linear actuator and pass the first formfitting element at the same time. The joint movement of the second formfitting means with the piston rod may be achieved by at least indirectly connecting the second formfitting elements to the piston rod. In order to fix the piston rod in relation to the cylinder, the at least one first formfitting element is implemented to engage in a formfitting way with one of the plurality of the second formfitting elements. Since, as already noted, the second formfitting elements are at least indirectly connected to the piston rod, further actuation of the linear actuator may be prevented by the form fit thus achieved, so that if the power supply to the linear actuator breaks down, the last set position of the linear actuator may be maintained using the lock according to an exemplary embodiment of the present invention.

The mechanical lock described may be usable for all types of linear actuators, such as hydraulic cylinder, pneumatic cylinder, or electrically impinged piston-cylinder units, which have a cylindrical construction and are to be securely mechanically locked in different discrete positions. The starting point for the present invention may be to specify an implementation of a trimmable horizontal stabilizer actuator which allows piston cylinder units to be used as trimmable horizontal stabilizer actuators, but other aircraft actuators such as actuators for flaps, slats, or spoilers may also be actuated using this mechanical lock, of course.

By the development of the mechanical lock suggested here and by the redundant power supply system, a completely new area of application may be opened up for linear actuators (electrical, hydraulic, or pneumatic), through which the use of piston cylinder units as trimmable horizontal stabilizer actuators may be made possible. By the mechanical lock, the linear actuator may be capable of securely maintaining its last set position if the power supply breaks down, for which it may not require any further power, as will be explained in greater detail in the following. In contrast to known frictional locks of piston cylinder units, a linear actuator equipped with the lock according to an exemplary embodiment of the present invention may be, with corresponding dimensioning of the lock, capable of securely maintaining forces in the magnitude of the positioning forces applied by the linear actuator itself.

Since the lock is essentially situated in the area of the outer circumference of the linear actuator or its cylinder, the lock may be inspected, maintained, tested, and even repaired easily at any time if necessary. Since the lock may transmit the forces from the cylinder to the piston rod if the two power supply systems to the linear actuator break down, it may represent a second load path, via which the loads of the linear actuator may be dissipated safely in case of power breakdown.

In the following, special embodiments of the first implementation of the lock according to the present invention previously described as the first are explained. However, these special embodiments may be transferred analogously with slight adaptations to the second implementation of the lock according to the present invention previously described as the second, of course.

In order that the at least one second formfitting element may reach a form fit with one of the plurality of first formfitting elements, the at least one second formfitting element is implemented to be able to assume either a locked position or, alternatively, an unlocked position. In the locked position, the at least one second formfitting element is engaged with one of the plurality of first formfitting elements, while in contrast in the unlocked position, the form fit cited is removed.

So that no additional power has to be applied to transfer the at least one second formfitting element into its locked position, the at least one second formfitting element may be, according to an exemplary embodiment, implemented to generate a restoring force which always attempts to move it out of the unlocked position into the locked position. In order to be able to counteract this restoring force so that the at least one second locking element does not assume its locked position at arbitrary times, the lock according to an exemplary embodiment of the present invention may also comprise an unlocking actuator, which is implemented and situated so that the at least one second formfitting element is held in its unlocked position against the restoring force by the activation of the unlocking actuator.

As already noted above, no additional energy may be required to actuate the lock in the event of a breakdown of the two power supply systems to the linear actuator. This may be made possible in that the activation of the unlocking actuator may occur via a power supply system which is coupled to that which actuates the linear actuator, which may result in one of the at least one second formfitting elements being moved into its locked position because of the restoring force in the event of a breakdown of the two power supply systems of the linear actuator. Thus, for example, in the case of a hydraulically actuated linear actuator, an unlocking actuator, which is also hydraulically actuated, may be provided, the impingement of the two actuators being coupled to one another in such a way that if the first and second power supply systems of the linear actuator break down, the power supply to the unlocking actuator breaks down, which may result in the at least one second locking element automatically assuming its locked position at the time of the power breakdown, by which the last set position of the linear actuator may be locked.

A concrete embodiment of the multiple first formfitting element may be implemented in the form of a plurality of grooves, for example, which enclose the cylinder around its outer circumference. For this purpose, the plurality of grooves may be incorporated in one piece or integrally in the outer circumference of the cylinder or situated in a separate tubular sleeve, for example, whose internal diameter is tailored to the external diameter of the cylinder in such a way that it may be attached thereto.

As already explained above, the at least one second formfitting element may be connected indirectly to the piston rod, in order to be able to move jointly therewith. This indirect connection may be produced via an immersion tube or dive pipe, for example, which is connected to the piston rod at an end placed outside the cylinder and concentrically encloses the piston rod at an interval or distance. This interval is dimensioned so that the cylinder may plunge into the interval when the linear actuator is actuated. In order to be able to fix the immersion tube and thus the piston rod in relation to the cylinder, the immersion tube receives the at least one second formfitting element in its inner wall in the area in which it overlaps with the cylinder. The connection of the immersion tube with the free end of the piston rod may be produced in that the immersion tube has a closed front wall at one end, on which the cited free end of the piston rod may be attached in the interior of the immersion tube, by which a type of bell is formed in combination.

A simple embodiment of the at least one second formfitting element may be implemented in that this formfitting element is implemented as a spring washer clamp, which is dimensioned in such a way that in its locked position it engages in a formfitting way in one of the plurality of grooves. Alternatively, for example, it would also be possible to provide multiple small piston cylinder units as the second formfitting element, which are situated around the outside of the cylinder, and whose piston rods engage due to spring loading in the grooves in the cylinder in the event of power breakdown.

To receive a second formfitting element implemented as a spring washer clamp in the immersion tube, an annular gap may be implemented in the area of the immersion tube in which it overlaps with the cylinder, which receives the spring washer clamp in its unlocked position.

According to a further aspect of the present invention, for the first time a trim actuator actuating system is equipped with at least one hydraulic linear actuator, through which it may be possible to use the trim actuator actuating system as described above in an aircraft, in order to thus actuate a trimmable horizontal stabilizer actuator implemented as a hydraulic piston cylinder unit.

BRIEF DESCRIPTION OF THE DRAWING

In the following, the present invention is explained in greater detail with reference to the attached drawing, which merely represents an exemplary embodiment of the present invention.

FIG. 4 shows a cross-sectional illustration of the lock according to an exemplary embodiment of the present invention along line B-B in FIG. 3a.

Identical or corresponding components are identified by identical or corresponding reference signs in all figures. The figures are not to scale, but may show qualitative size ratios.

DESCRIPTION OF AN EXEMPLARY EMBODIMENT OF THE PRESENT INVENTION

Figure 1:
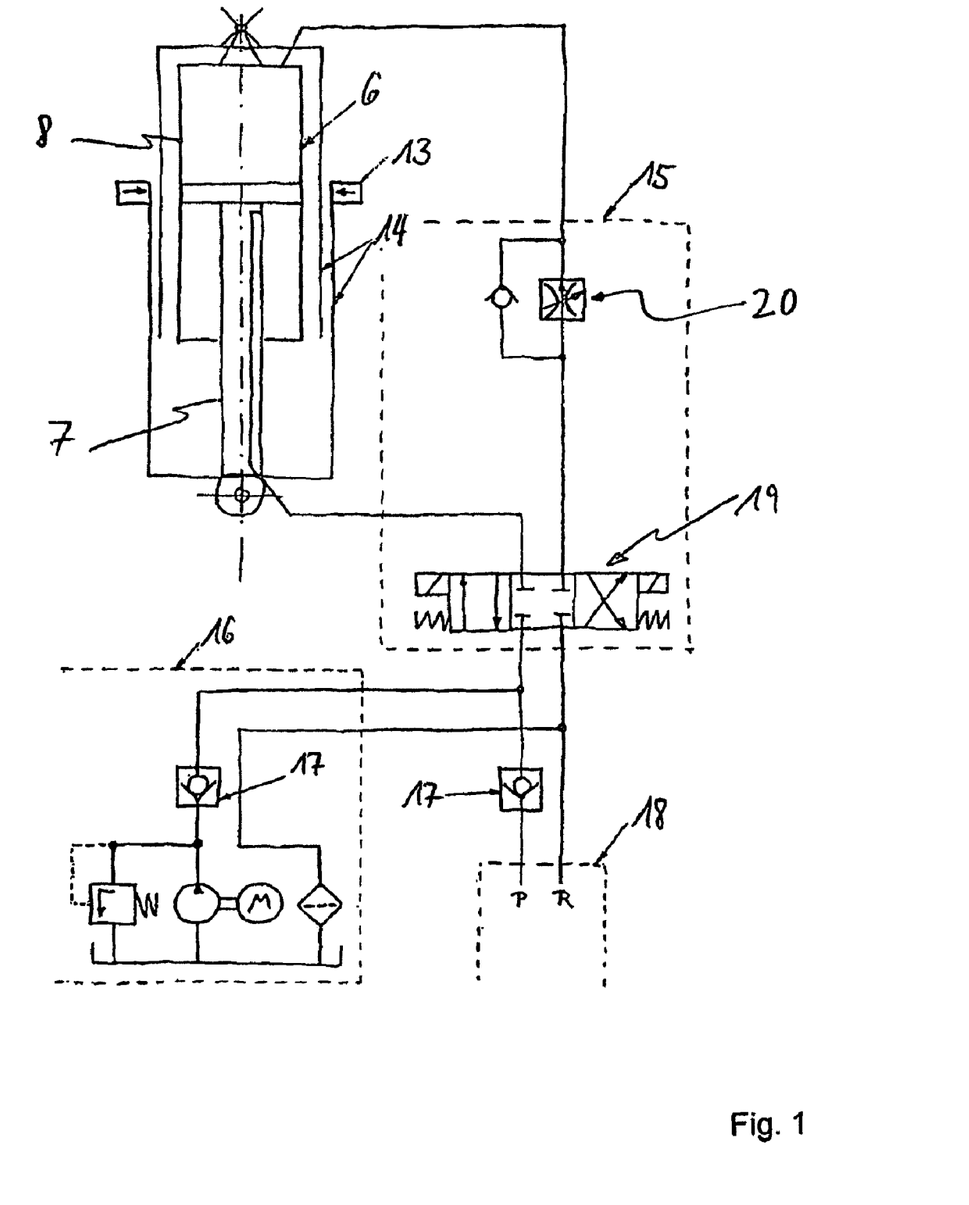
FIG. 1 shows a hydraulic circuit diagram which explains the trim actuator actuating system according to an exemplary embodiment of the present invention.

In the following, the trim actuator actuating system according to an exemplary embodiment of the present invention is explained first with reference to the hydraulic circuit diagram of FIG. 1. The trim actuator actuating system shown in FIG. 1 comprises a hydraulic linear actuator 6, a first power supply system 18, and a second power supply system 16, the second power supply system 16 being operated via a separate electrical hydraulic fluid pump. The linear actuator 6 has an external lock 13, which will be explained in greater detail in the further course of this description of the figures, and which is used as a second security stage in case of breakdown of the two power supply systems 16, 18. At this stage it is only noted that an external second load path is opened by the lock 13, via which the loads of the hydraulic cylinder may be transferred in the event of a power breakdown.

The linear actuator 6 has hydraulic power applied to it in the form of hydraulic pressure via the first power supply system 18 during normal operation, through which the piston rod 7 of the linear actuator 6 is set into motion. In order to reverse the movement direction of the piston rod 7, the pressure application to the linear actuator 6 occurs via a 4/3 way valve 19. To monitor any leakage losses, the control unit 15 also comprises a flow regulating valve 20, via which any leaks or pressure losses may be determined.

In order to be able to maintain the pressure applied to the linear actuator 6 in case of breakdown of the first power supply system 18, in the exemplary embodiment shown here, the second power supply system 16 is coupled to the line system via which the first power supply system 18 applies hydraulic power to the linear actuator 16. If the first power supply system 18 actually breaks down, this breakdown is registered by the control unit 15, which instantly activates the second power supply unit 16, through which the further application of hydraulic power to the linear actuator 6 may be ensured.

In order that the two power supply systems 16, 18 do not mutually influence one another, they are hydraulically decoupled from one another via check valves 17.

If the second power supply system 16 also breaks down, the mechanical lock 13 becomes active, via which the last set position of the linear actuator 6 is maintained via the second load path 14. This mechanical lock will now be explained with reference to FIGS. 2 through 4.

The lock is used to be able to fix the piston rod 7 of the linear actuator 6 in relation to the cylinder 8. A linear actuator 6 of this type in the form of a hydraulic piston cylinder unit 6 may be recognized well in FIG. 3*a*. For this purpose, the hydraulic piston cylinder unit 6 is essentially composed of a cylinder 8 and a piston rod 7, which is mounted so it is displaceable in the longitudinal direction in the cylinder 8.

Through a pressure impingement of the cavity of the cylinder, the piston rod 7 is displaced in a known way in the longitudinal direction of the cylinder 8. As may be seen from FIG. 3*a* and especially well from FIG. 3*b*, a tubular sleeve 1, which is equipped around its outer circumference with a plurality of grooves 9, which are situated at a distance from one another over the longitudinal direction of the cylinder 8, is attached via a clamp, for example, to the outer circumference of the cylinder 8. Although the grooves 9 are provided in a separate tubular sleeve 1 in the example shown here, it is also possible to incorporate the grooves 9 directly into the outer circumference of the cylinder 8, of course.

Figure 3A:
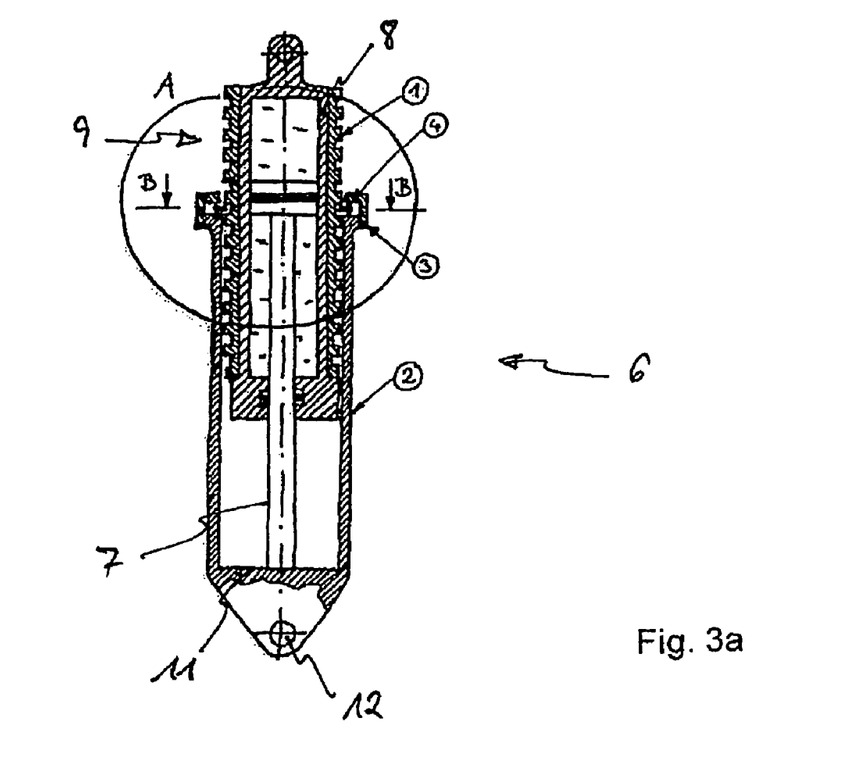
FIG. 3a shows a longitudinal section through a piston cylinder unit equipped with the lock.
Figure 3B:
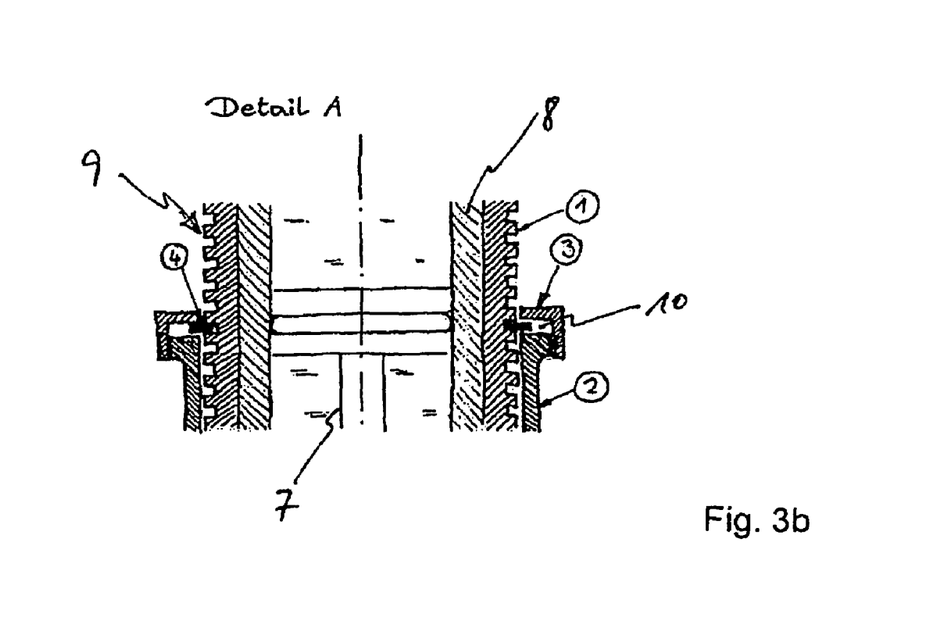
FIG. 3b shows detail A of FIG. 3a in an enlarged illustration.
Figure 4:
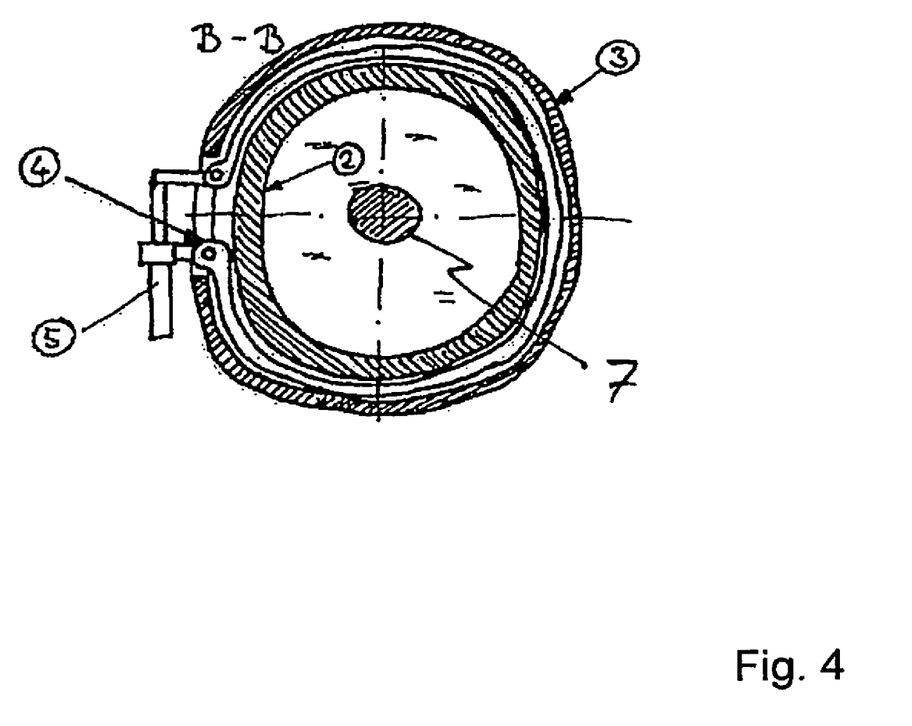

As FIG. 3*b* also shows, the piston rod 7 is concentrically enclosed by a so-called immersion tube 2, which is connected to the free end of the piston rod 7. The immersion tube 2 encloses the piston rod 7 at an interval in such a way that the cylinder 8 may plunge into this interval upon an actuation of the piston cylinder unit 6.

The piston rod 7 is connected to the immersion tube 2 via a front wall which closes the immersion tube 2 on one side, and in whose extension an eye or lug for linking the piston cylinder unit 6 is implemented.

The active lock unit 13 in the form of the at least one second locking element is situated in the end of the immersion tube 2 opposite to the end closed by the front wall 11. As may be seen best in FIGS. 2 and 4, in the exemplary embodiment shown here, the at least one second formfitting element 4 is implemented as a spring washer clamp 4, which is received in its unlocked position by an annular gap 10, which is implemented at the open end of the immersion tube 2. This annular gap 10 may be formed with the aid of an anchor plate or retaining rosette 3, for example, which may be screwed onto an expansion at the end of the immersion tube 2. The internal diameter of the spring washer clamp 4 is tailored so that it essentially corresponds to the internal diameter of the grooves 9 in the tubular sleeve 1 in the relaxed state, i.e., in its locking position.

Figure 3C:
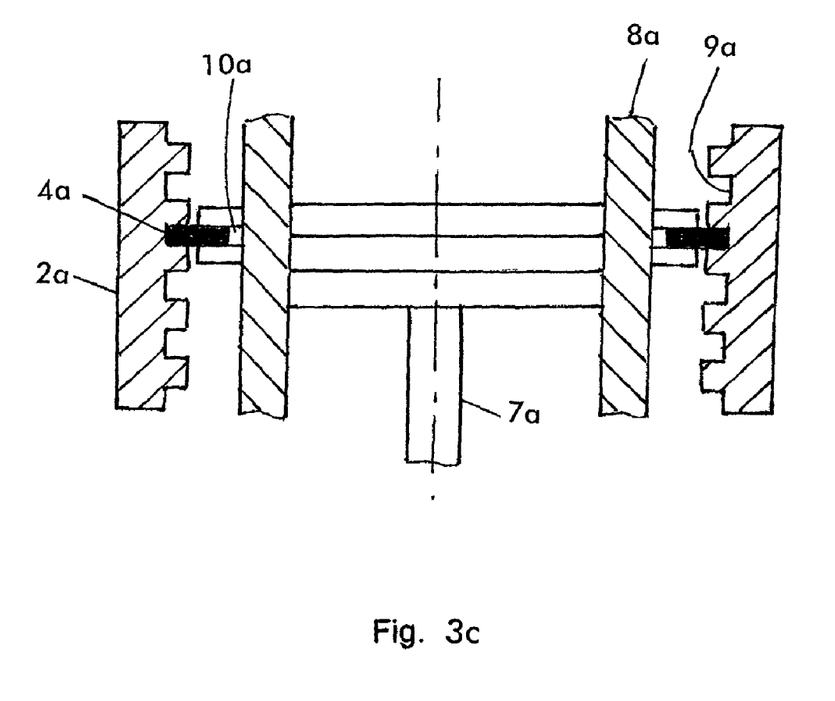
FIG. 3c shows an alternative arrangement to that shown in FIG. 3b.

FIG. 3*c* shows an alternative arrangement to that shown in FIG. 3*b*. Instead of grooves 9 being on outer circumference of tubular sleeve 1, grooves 9a are on inner circumference of immersion tube 2*a*. Tubular sleeve 1 has been eliminated. Annular gap 10*a* is formed on cylinder 8*a*, instead of annular gap 10 being at an open end of immersion tube 2. Piston rod 7*a* corresponds to piston rod 7 in FIG. 3*b* and moves in the longitudinal direction of cylinder 8*a* just as piston rod 7 moves in the longitudinal direction of cylinder 8. Annular gap 10*a* receives spring washer clamp 4*a* when spring washer clamp 4*a* is in its unlocked position.

Figure 2:
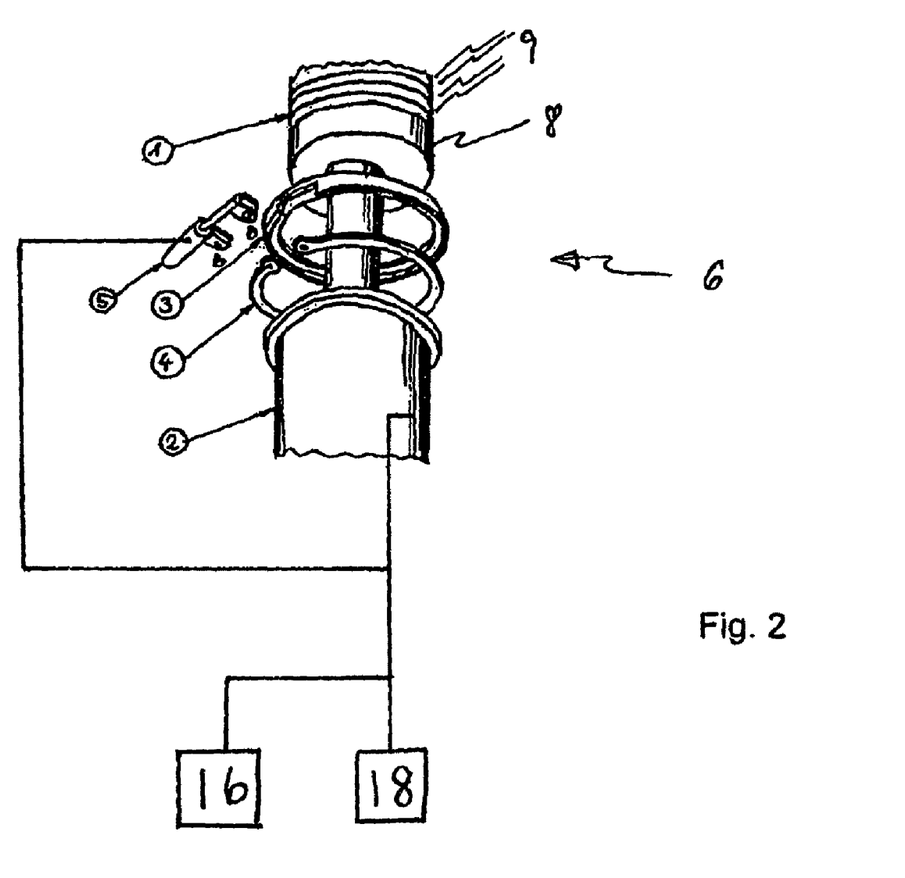
FIG. 2 is an exploded view of the lock of the linear actuator.

So that the piston cylinder unit is not continuously locked using the lock according to the present invention, however, a small unlocking actuator 5 is provided at the open ends of the spring washer clamp 4, which actuator 5 is connected to a power supply which is coupled to that which actuates the piston cylinder unit 6 itself. Preferably, this may be the first power supply system 18 and the second power supply system 16. By actuating the unlocking actuator 5, the spring washer clamp 4 is held in its unlocked position, in which it is received by the annular gap 10, so that free actuation of the piston cylinder unit 6 is provided, against its restoring force, which always attempts to move it into the locked position.

If both the first and also the second power supply systems to the piston cylinder unit 6 break down, this results, because of the coupling of the power supply to the unlocking actuator 5 with the first power supply system 18 and the second power supply system 16 to the piston cylinder unit 6, in the unlocking actuator no longer being able to compensate for the restoring force applied by the spring washer clamp 4, which results in the spring washer clamp 4 moving from its unlocked position into its locked position, in which it engages with one of the grooves 9 in the tubular sleeve 1, through which the piston rod 7 is fixed in relation to the cylinder 8. The formfitting connection produced in this way between the two eyes 12 of the piston cylinder unit 6 locks it securely and represents a second load path as a second security stage.

Moreover, it is to be noted that "comprising" or "including" does not exclude other elements or steps and "a" or "one" does not exclude multiples. Furthermore, it is to be noted that features or steps which have been described with reference to one of the above exemplary embodiments may also be used in combination with other features or steps of other exemplary embodiments described above. Reference signs in the claims are not to be seen as a restriction.

The invention claimed is:

1. A trim actuator actuating system for a hydraulically actuatable trimmable horizontal stabilizer actuator (THSA) of an aircraft, the system comprising:
at least one hydraulic linear actuator;
a first hydraulic power supply system; and
an autonomous second hydraulic power supply system;
wherein the at least one hydraulic linear actuator is coupled to the first power supply system, which applies hydraulic power to the hydraulic linear actuator during normal operation, and the at least one hydraulic linear actuator has hydraulic power applied to it by the second power supply system during malfunction operation, in which the first power supply system has at least partially broken down, wherein the at least one hydraulic linear actuator is implemented as a piston cylinder unit having a piston rod and a cylinder, and the linear actuator comprises a mechanical lock, which is configured to fix the piston rod in relation to the cylinder in the last position set before a breakdown in the event of a breakdown of both the first and the second power supply systems, wherein the mechanical lock comprises at least one first form fitting element that is situated around an outer circumference in an area of the exit of the piston rod on the cylinder and a plurality of second form fitting elements that move jointly with the piston rod upon an actuation of the linear actuator and past the first form fitting element, wherein the at least one first form fitting element is engageable in a form fitting way with one of the plurality of second form fitting elements at discrete positions in a longitudinal direction of the piston rod by which the piston rod is fixed in relation to the cylinder;

wherein the lock comprises an immersion tube that is connected to the piston rod at an end outside the cylinder and encloses the piston rod concentrically at an interval, the interval being dimensioned in such a way that the cylinder plunges into the interval upon an actuation of the linear actuator;

wherein the plurality of second form fitting elements is formed by a plurality of grooves that are incorporated into an inner circumference of the immersion tube.

2. The trim actuator actuating system of claim 1, further comprising:

a control unit, to which the first power supply system and also the second power supply system are coupled;

wherein the control unit supplies the at least one hydraulic linear actuator with hydraulic power from the first power supply system during normal operation, and the control unit supplies the at least one hydraulic linear actuator with hydraulic power from the second hydraulic power supply system during malfunction operation.

3. The trim actuator actuating system of claim 2, wherein the first hydraulic power supply system is coupled to a hydraulic main power supply of the aircraft.

4. The trim actuator actuating system of claim 2, wherein the second hydraulic power supply system is independent of the main power supply of the aircraft and has a separate hydraulic fluid container and a separate hydraulic pump.

5. The trim actuator actuating system of claim 1, wherein the second power supply system applies hydraulic power to the first power supply system for the power supply of the linear actuator during malfunction operation.

6. The trim actuator actuating system of claim 1, wherein the at least one first formfitting element is adapted to produce a restoring force, which attempts to move it out of the unlocked position into the locked position.

7. The trim actuator actuating system of claim 6, wherein the lock comprises an unlocking actuator, by whose activation the at least one first formfitting element is held in its unlocked position against the restoring force.

8. The trim actuator actuating system of claim 7, wherein the unlocking actuator is activated via a power supply which is coupled to that which actuates the linear actuator, so that if the power supply of the linear actuator breaks down, the at least one second formfitting element moves into the locked position because of the restoring force.

9. The trim actuator actuating system of claim 1, wherein the immersion tube comprises a closed front wall at one end, via which the piston rod is at least indirectly connected to the immersion tube itself.

10. The trim actuator actuating system of claim 1, wherein the at least one first formfitting element is implemented as a spring washer clamp, which engages in a formfitting way in one of the plurality of grooves in its locked position.

11. The trim actuator actuating system of claim 10, wherein the cylinder forms, in the area in which it overlaps with the immersion tube, an annular gap in which the spring washer clamp is received.

12. The use of a trim actuator actuating system of claim 1 in an aircraft, in order to thus actuate at least one THSA implemented as a hydraulic piston cylinder unit.

* * * * *